Jan. 8, 1963  J. K. DOWNING  3,072,041
FANS

Filed Jan. 5, 1961  6 Sheets-Sheet 1

Inventor
JOHN KENNETH DOWNING
By
Attorney

Jan. 8, 1963  J. K. DOWNING  3,072,041
FANS

Filed Jan. 5, 1961  6 Sheets-Sheet 3

Inventor
JOHN KENNETH DOWNING

By B. P. Fishburn, Jr.
Attorney

Jan. 8, 1963    J. K. DOWNING    3,072,041
FANS
Filed Jan. 5, 1961    6 Sheets-Sheet 4

Inventor
JOHN KENNETH DOWNING
By B. P. Fishburne, jr.
Attorney

Jan. 8, 1963 J. K. DOWNING 3,072,041
FANS
Filed Jan. 5, 1961 6 Sheets-Sheet 5

Inventor
JOHN KENNETH DOWNING
By B. P. Fishburne, Jr.
Attorney

Jan. 8, 1963     J. K. DOWNING     3,072,041
FANS

Filed Jan. 5, 1961     6 Sheets-Sheet 6

Inventor
JOHN KENNETH DOWNING

By B. P. Fishburne, Jr.
Attorney

United States Patent Office 3,072,041
Patented Jan. 8, 1963

3,072,041
FANS
John Kenneth Downing, Ifield, England, assignor to Vent-Axia Limited, London, England
Filed Jan. 5, 1961, Ser. No. 80,926
Claims priority, application Great Britain Jan. 6, 1960
7 Claims. (Cl. 98—116)

This invention relates to ventilating fans of the kind comprising an open-ended casing for mounting in a through-opening in a window, wall, partition or the like of a room to be ventilated, a housing centrally located within the casing, and an impeller rotatable from an electric motor within the housing.

Frequently this kind of fan is fitted with a shutter device by means of which the air-passage through the fan casing can be closed when the impeller is at rest or when the velocity of the outer air exceeds the induced air flow through the fan casing.

Heretofore the shutter device has generally been fitted in the outlet end portion of the fan casing, but this arrangement is not wholly satisfactory for the reason that the closure plates of the shutter device are subjected to disturbing fluttering which interferes with steady output. On the other hand, previous attempts to fit the shutter device at the inlet of the fan casing have led to undesirable lengthening of the fan casing in order to provide for the necessary opening movement of the closure plates.

An object of my present invention is to obviate or mitigate the disadvantages aforementioned.

A further object of the present invention is to provide a ventilating fan having a new and improved shutter device for closing the aperture through the fan casing and suitable for fitment within the inlet portion of the outer casing. The construction and arrangement of the shutter device is such that the device closes automatically when the fan impeller is at rest or when the velocity of the outer atmosphere exceeds the induced air flow through the fan housing; in addition, the arrangement is such that the device can be opened and closed manually at will.

Another object of the present invention is to provide a shutter device comprising an openwork supporting member adapted to be secured in the fan casing on the inlet side of the impeller, a plurality of shutter plates pivotally mounted adjacent one another on said member, said plates being out of balance whereby they close automatically when the velocity of the outside air is greater than the induced air flow, and when the impeller is at rest. A further object of the invention is to provide means adapted to co-operate with the shutter plates to maintain a position assumed by the plates relative to said member.

The shutter plates may have their pivotal axes tangential to a common circle and such of them as may be necessary may be provided with counterweight means tending to close the plates, whereas the air flow induced by the impeller acts to open said plates.

Embodiments of the invention will now be described, by way of example, with reference to the accompanying drawings, in which.

Figure 2:
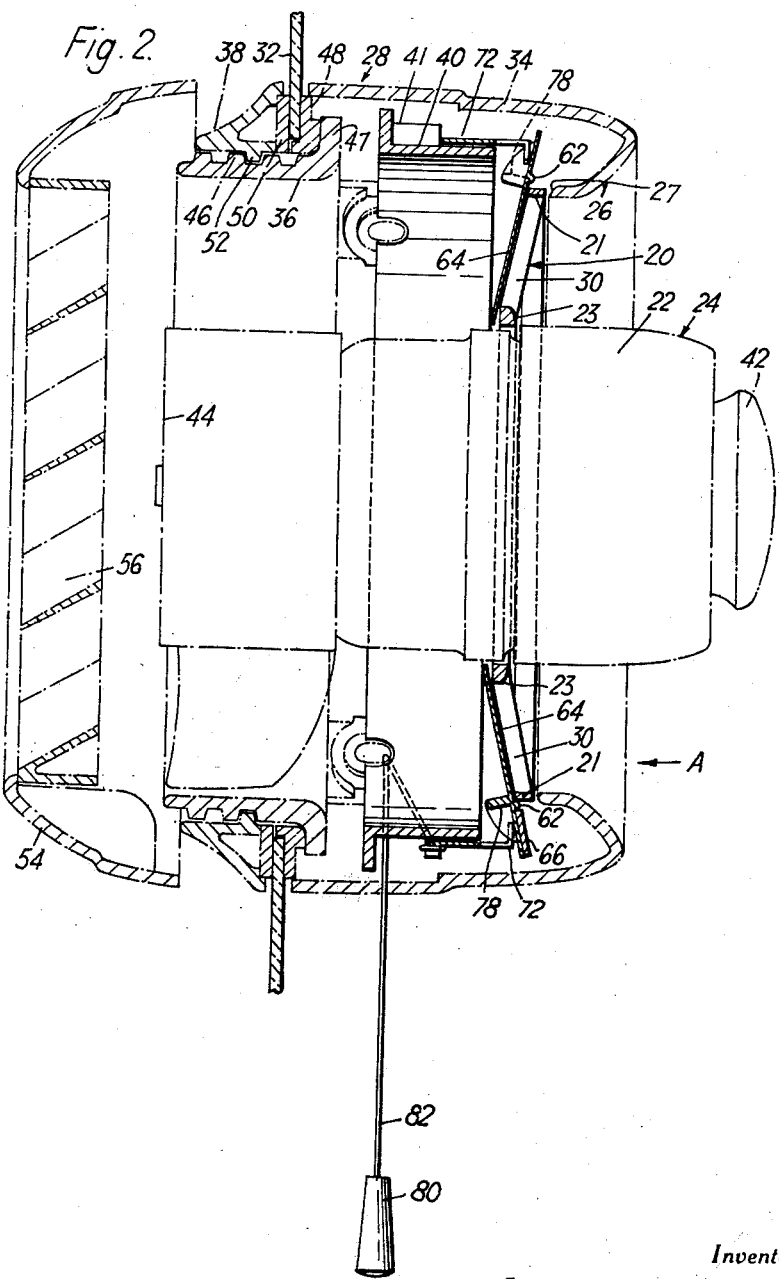
FIG. 2 is a section on the line II—II of FIG. 1, the casing again being shown in dot-dash lines.
Figure 3:
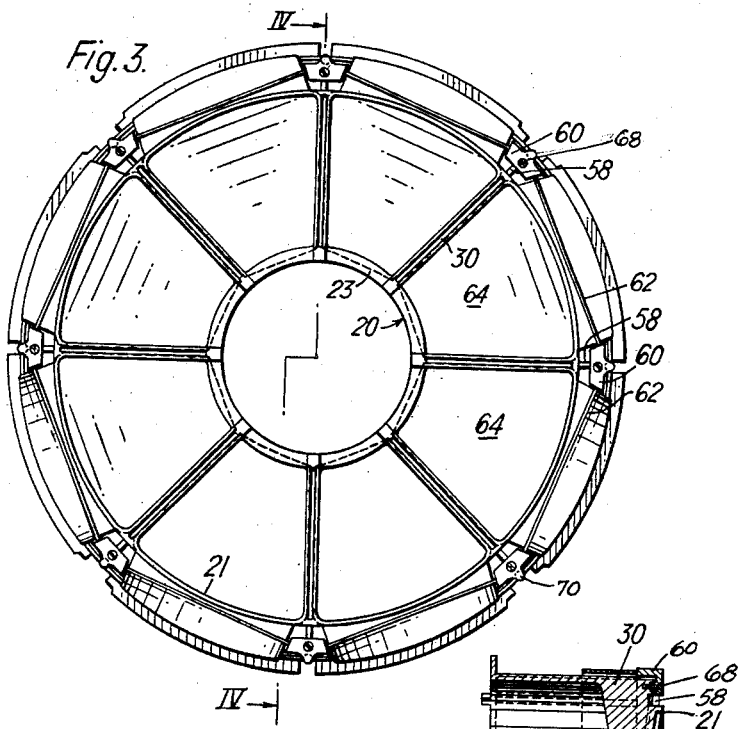
FIG. 3 is a front elevation of the frame of a shutter device according to the invention.
Figure 4:
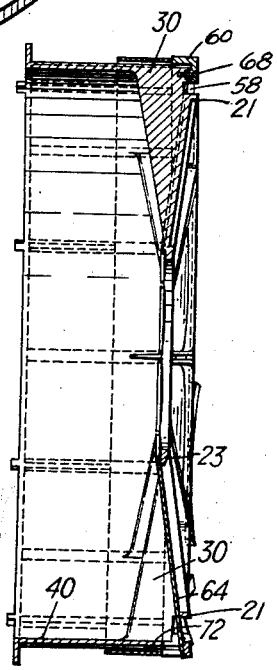
FIG. 4 is a section on the line IV—IV of FIG. 3.

Referring now to the drawings, the frame of a ventilating fan comprises a spider which includes an inner ring 22 which is the housing of an electric motor 24 and an outer ring 26 which is an inwardly and reversely bent part of the fan casing 28, the rings 22 and 26 being interconnected by radial arms (not seen in the drawing). The fan casing 28 is tubular with inner and outer open ends and has a central longitudinal axis extending between said ends and which is disposed horizontally when the casing extends through a through opening provided therefor in the peripheral surround structure of a room. In FIG. 2 of the drawing, the casing 28 is mounted in an opening therefor in a window pane 32, and comprises an inner end portion 34 located within the room, an intermediate portion 36 within the window pane opening, and an outer end portion 38 outside the window pane 32. The inner end portion 34 has secured thereto internally thereof a frame 40 for a shutter device to be hereinafter described. The electric motor 24 drives an impeller 44, 42 denoting a plug for connection to a source of supply of electricity. The intermediate portion 36 is externally screw-threaded at 46 and has a flange 47 with a washer 48 of rubber or other elastomeric material secured to the outwardly facing face of the flange. The opposed end face of the outer end portion 38 has a washer 50 of rubber or other elastomeric material secured thereto. The portion 38 is internally screw-threaded at 52 complementarily to the threading 46 on the portion 36, so that by screwing the portion 38 on to the portion 36, the glass pane 32 is gripped between the washers 48 and 50, and the fan casing 28 is firmly secured in position on the pane 32. A cowl ring 54 secured to the outer end portion 38 has, internally thereof, means providing a seating for a cylindrical grid 56.

Figures 7, 10:
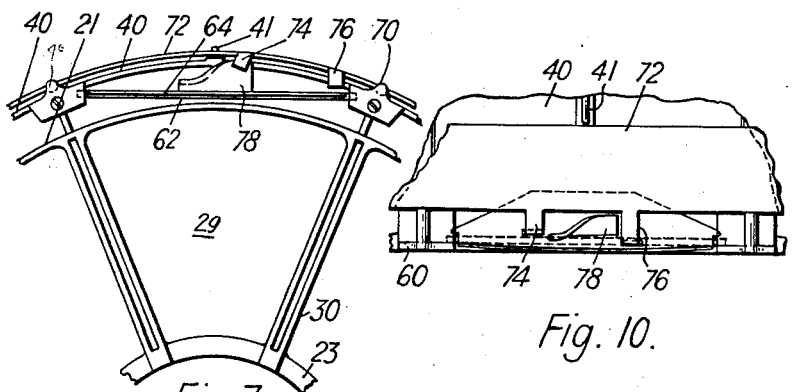
FIGS. 7 and 8 are views corresponding to FIGS. 5 and 6, but with the shutter plate locked in the open position.

An openwork supporting member in the form of a second spider 20 is provided, the spider 20 comprising an outer ring 21 located adjacent the free edge 27 of the ring 26 and secured to the interior of the fan casing 28, an inner ring 23, secured about the housing 22 of the electric motor 24, and a plurality of equally-spaced radial arm 30 interconnecting the two rings and defining therewith a plurality of sectoral openings 29 (FIG. 7). The ring 26 blanks off an outer peripheral zone of the outer space defined between the fan casing 28 and the housing 22. The outer ring 21 carries externally a plurality of escutcheon plates in the form of T-members whereof the stems 58 are aligned with the radial arms 30 and the bars 60 are equally spaced outwardly from, and are substantially parallel to the ring 26. The bars 60 are countersunk at each of their ends and there provide bearings for axles 62 which pivot therein and which are secured to shutter plates 64, whereby the plates are adapted to pivot with the axles. The axles 62 are tangential to a common circle concentric with and of slightly greater diameter than the outer ring 21.

The shutter plates 64 are disposed with their radial edges adjacent one another and are adapted to blank off or close the sectoral openings or spaces between the inner and outer rings 23 and 21 of the spider 20, the shutter plates in the lower half of the shutter device carrying counterweights 66 acting to ensure proper closure of the plates. When the shutter device is fitted in position in the ventilating fan the air passage through the fan casing 28 is closed by the shutter plates 64 while the impeller 44 is stationary. As soon as the impeller 44 is revolved, however, the air flow induced in the direction of arrow A (FIG. 2) forces the plates to open about their pivot axes and they will remain open unless the velocity of the outside air is greater than that of the induced air flow, when the plates will close.

A preferred but optional feature of the present invention is the provision of means for locking the shutter plates at least in the open position, and preferably in both the open and closed positions, provision being made for rendering said means inoperative to permit automatic operation of the shutter blades responsive to the induced air flow and the velocity of the outside air.

Figure 1:
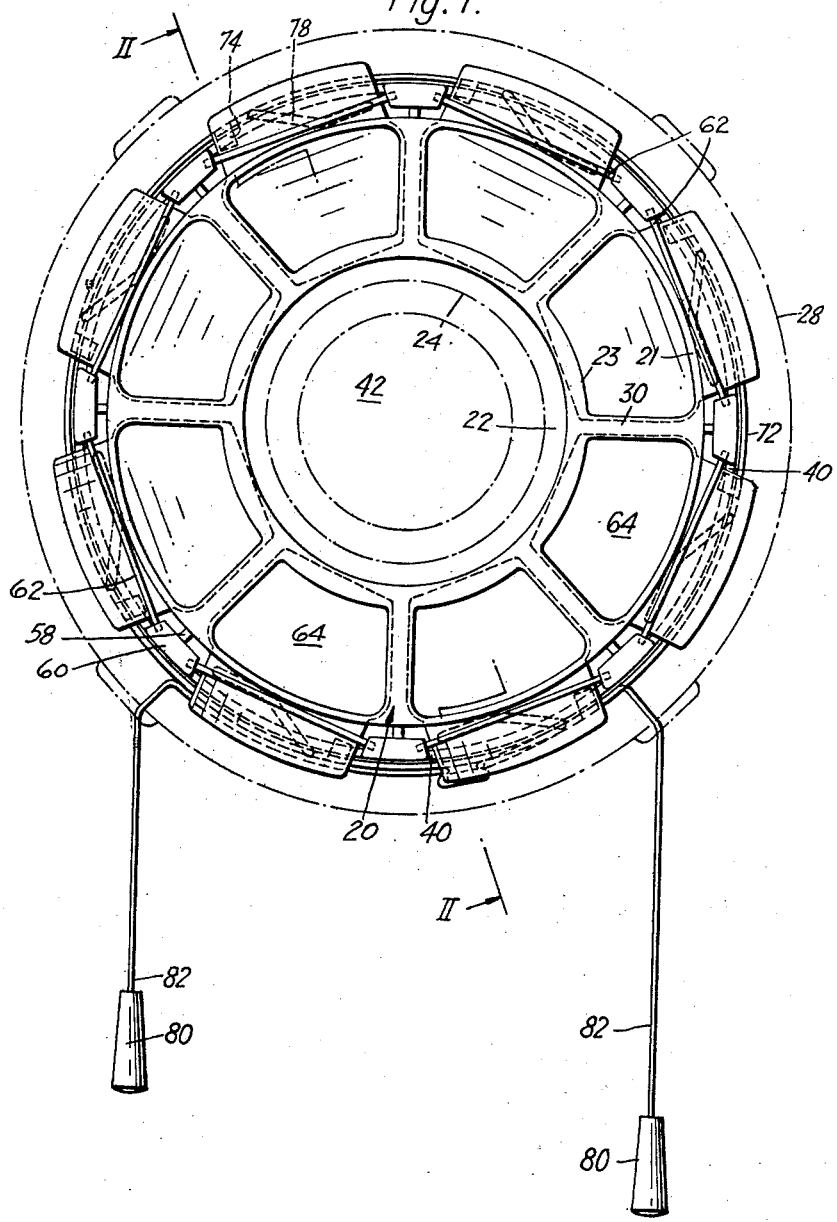
FIG. 1 is a front elevation of a fan of the kind aforesaid with the forward portion of the fan casing omitted to expose details of construction, the fan embodying a shutter device in accordance with the present invention, and the fan casing being shown in dot-dash lines.
Figure 5:
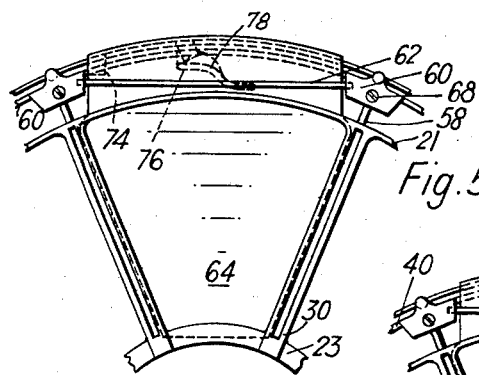
FIG. 5 is a segmental front elevation of the frame of the shutter device with a shutter plate locked in closed position and illustrating the means for effecting manual control of the shutter plates.
Figure 9:
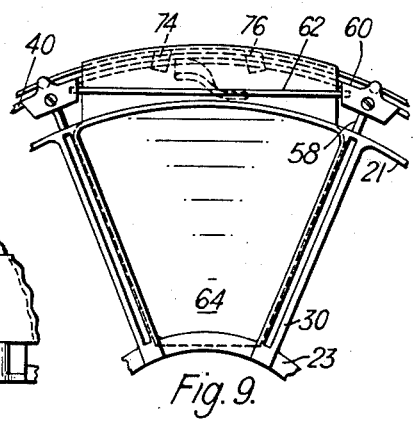
FIGS. 9 and 10 are views corresponding, respectively, to FIGS. 5 and 6, but with the shutter plates unlocked and free to open and close automatically.
Figure 6:
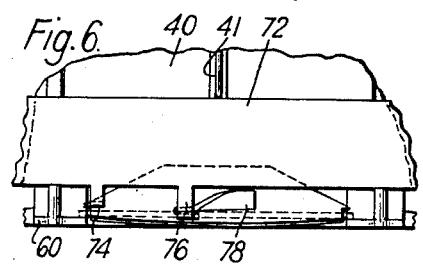
FIG. 6 is a plan view of the FIG. 5 construction.
Figure 8:
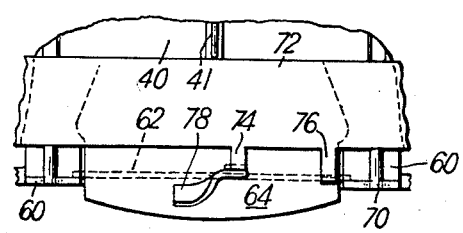

FIGS. 5 to 10 illustrate particularly a manual control of the shutter plates 64. In particular FIGS. 5 and 6 illustrate a shutter plate 64 locked in the closed position, FIGS. 7 and 8 illustrate a shutter plate 64 locked in the open position, and FIGS. 9 and 10 illustrate a shutter plate 64 in a condition where it is not locked, and opening and closing thereof is automatic and subject to the influences set forth in the final two sentences of the second preceding paragraph. Referring to FIGS. 5 to 10, the bars 60 of the T-members are secured in position on the stem 58 by means of screws 68. The T-members are formed with projections 70 on the sides of the bars 60 remote from the stems 58. A ring 72 passes over the projections 70 and is free to move relative thereto, the frame 40 carrying on its exterior face ribs 41 which guide the ring 72 in its movement. The ring 72 carries a pair of spaced abutments 74 and 76 which are located between each adjacent pair of projections 70 and are adapted to co-act with cam members 78 on the shutter plates 64. The angular position of the ring 72 can be changed manually by pulling on handles 80 at the free ends of cords 82 (FIGS. 1 and 2) which are anchored to the ring, the free ends of the cords hanging from the fan casing for convenient manipulation.

Pulling of one cord moves the ring in one direction and pulling of the other cord moves the ring in the other direction. In the FIGS. 9 and 10 position the cam member is clear of the two abutments 74 and 76 and the shutter plate 64 is free to react automatically to air pressure changes. In the FIGS. 5 and 6 position one of the cords 82 has been pulled and the shutter plate 64 is in the closed position and is locked there by the abutment 76 engaging the cam 78 and positively preventing opening movement of the shutter plate about the axis of the axle 62. In the FIGS. 7 and 8 position, the other of the cords 82 has been pulled and the shutter plate 64 is in the fully open position and is locked therein by the abutment 74 engaging the cam 78 and positively preventing closing movement of the shutter plate about the axis of the axle 62.

FIGS. 11 to 16 illustrate a modification wherein the ring 72 has a single striker 84 replacing the two abutments 74 and 76 of the FIGS. 5 to 10 construction, and each shutter plate 64 has, on its surface adjacent the ring 72, a cam 86 replacing the cam 78 of the FIGS. 5 to 10 construction. Otherwise in these views parts already referred to are denoted by the reference numerals already used for this purpose.

Figure 11:
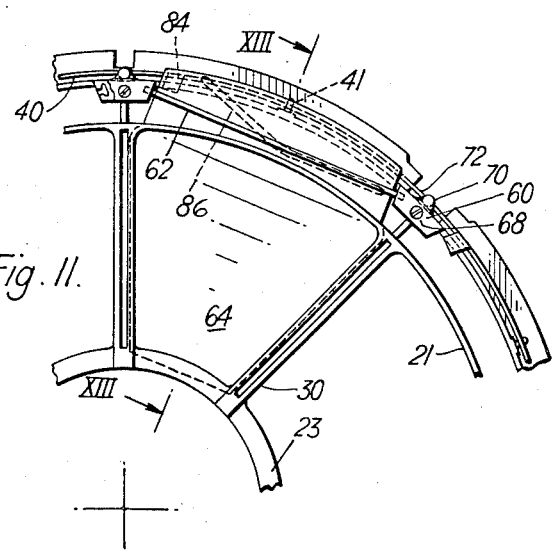
FIG. 11 is a segmental front elevation of the frame of the shutter device with a shutter plate in the closed position, and illustrating modified cam means for controlling opening movement of the shutter plate, the cam means being in position to permit automatic operation of the shutter blades.
Figure 12:
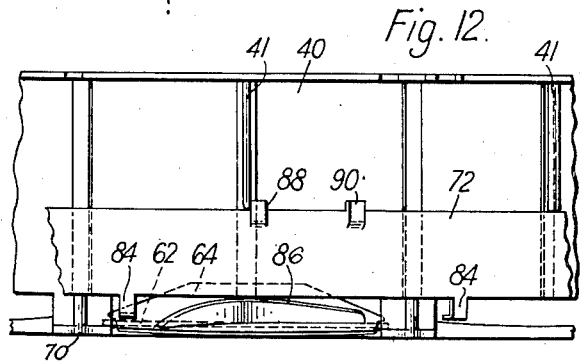
FIG. 12 is a plan view of the FIG. 11 construction.
Figure 13:
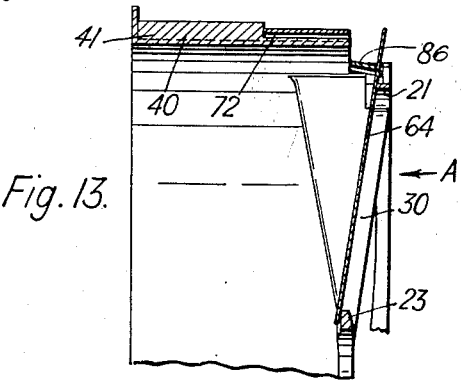
FIG. 13 is a section on the line XIII—XIII of FIG. 11.
Figure 14:
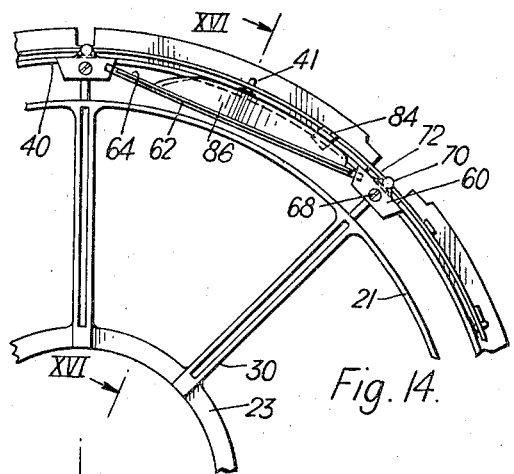
FIG. 14, 15 and 16 are views corresponding, respectively, to FIGS. 11, 12, and 13, but with the cam means in a position wherein the shutter plate is maintained in the open position.
Figure 15:
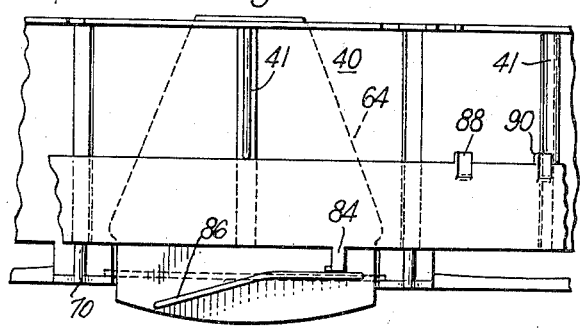
Figure 16:
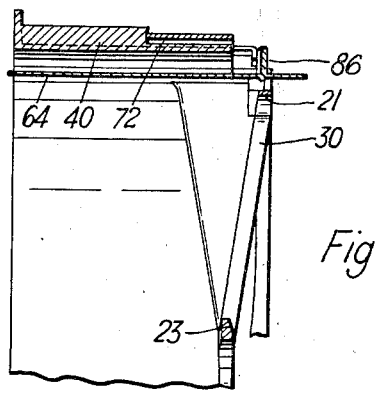

In FIGS. 11 to 13, the shutter plate 64 is closed and free to re-act to flow of air in the direction of the arrow A (FIG. 13).

The ring 72 is provided on its edge remote from the striker 84 with two abutments 88 and 90 per shutter plate, these abutments determining the arcuate distance through which the ring can travel. The abutments 88 and 90 cooperate with the ribs 41 on the exterior face of the frame 40 and it will be noted that in FIG. 12 the abutment 88 rests against one rib 41, while in FIG. 15 the abutment 90 rests against the next rib 41.

As in the embodiment of the invention first described, the ring 72 can be turned manually by means of cords to and from the locked open position from and to the closed position, and, manifestly, also to intermediate positions.

The shutter plates 64 may be cushioned on movement to the closed position by a rubber or the like ring mounted on the shutter-adjacent face of the inner ring 23 of the spider 20, or rubber or the like strips may be mounted for this purpose on the shutter-adjacent faces of the arms 30.

The components of the ventilating fan and shutter may be of metal, but preferably are moulded of a suitable synthetic resin.

I claim:

1. A ventilating fan comprising a tubular casing which has inner and outer open ends and has a central longitudinal axis extending between said ends and adapted, when the casing is mounted in the operative position, to extend through a through opening therefor in the peripheral surround structure of a room with said inner end facing the room interior and said outer end facing the room exterior to provide for communication through said casing between the room interior and the room exterior, an electric motor, a housing about said motor, means supporting said housing co-axially within said casing and adjacent said inner end of the latter, said casing and said housing defining therebetween an annular space, an inwardly and reversely bent part of said casing at said inner end thereof blanking off an outer peripheral zone of said annular space, an impeller within said casing adjacent said outer end thereof, means mounting said impeller in driving relationship with said motor and co-axially with the latter, said impeller being adapted when driven to sweep said casing and induce a flow of air through said annular space in the direction from said inner end of the casing, and a shutter device in said annular space, said shutter device comprising an inner ring mounted about said housing, an outer-ring co-axial with said inner ring and located adjacent the free edge of said casing part, a plurality of spaced radial arms interconnecting said inner and outer rings and defining with said rings a plurality of sectoral openings, a plurality of shutter plates adapted to blank off said openings, and means mounting said shutter plates for pivotal movement about axes tangential to a common circle of greater radius than said outer ring to close against said rings and said arms from the direction of said outer end of said casing and blank off said openings, said shutter plates being out-of-balance whereby they tend to the closed position and such closure of said shutter plates being adapted to be overcome automatically to open said plates when the pressure of an air flow induced by said impeller exceeds the pressure of any air flow through said casing in the opposite direction.

2. A ventilating fan comprising a tubular casing which has inner and outer open ends and has a central longitudinal axis extending between said ends and adapted, when the casing is mounted in the operative position, to extend through a through opening therefor in the peripheral surround structure of a room with said inner end facing the room interior and said outer end facing the room exterior to provide for communication through said casing between the room interior and the room exterior, an electric motor, a housing about said motor, means supporting said housing co-axially within said casing adjacent said inner end of the latter, said casing and said housing defining therebetween an annular space, means at said inner end of said casing blanking off an outer peripheral zone of said annular space, an impeller within said casing adjacent said outer end thereof, means mounting said impeller in driving relationship with said motor and co-axially with the latter, said impeller being adapted when driven to sweep said casing and induce a flow of air through said annular space in the direction from said inner end of said casing, and a shutter device in said annular space, said shutter device comprising an outer ring located adjacent said blanking-off means, an inner ring co-axial with said outer ring and mounted about said housing, said inner ring being located closer to said casing outer end than is said outer ring, a plurality of equally-spaced radial arms interconnecting said inner and outer rings and defining with said rings a plurality of sectoral openings, a plurality of shutter plates adapted to blank off said openings, means mounting said shutter plates for pivotal movement about axes tangential to a common circle of greater radius than said outer ring to close against said rings and said arms from the direction of said outer end of said casing and blank off said openings, said shutter plates being out-of-balance about said axes whereby they tend to close when said casing is in the operative position, such closure of said shutter plates being adapted to be overcome automatically to open said plates when the pressure of an air flow induced by said impeller exceeds the velocity of any air flow through said casing in the opposite direction, the degree of such opening of said plates being dependent upon the amount by which the impeller-induced air flow pressure exceeds that of any air flow through said casing in the opposite direction.

3. A ventilating fan comprising a tubular casing which has inner and outer open ends and has a central longitudinal axis extending between said ends and adapted, when the casing is mounted in the operative position, to extend through a through opening therefor in the peripheral surround structure of a room with said inner end facing the room interior and said outer end facing the room exterior to provide for communication through said casing between the room interior and the room exterior, an electric motor, a housing about said motor, means supporting said housing co-axially within said casing adjacent said inner end of the latter, said casing and said housing defining therebetween an annular space, inwardly extending means integral with said casing at said inner end thereof blanking off an outer peripheral zone of said annular space, an impeller within said casing adjacent said outer end thereof, means mounting said impeller in driving relationship with said motor and coaxially with the latter, said impeller being adapted when driven to sweep said casing and induce a flow of air through said annular space in the direction from said inner end of said casing, and a shutter device in said annular space, said shutter device comprising an outer ring located adjacent said inwardly-extending means, an inner ring co-axial with said outer ring and mounted about said housing, said inner ring being located closer to said casing outer end than is said outer ring, a plurality of equally-spaced radial arms interconnecting said inner and outer rings and defining with said rings a plurality of sectoral openings, a plurality of shutter plates adapted to blank off said openings, members on said outer ring in line with each said radial arm, axles extending between adjacent ones of said members and disposed along axes tangential to a common circle of greater radius than said outer ring, said members having bearings in which said axles are freely rotatable, means securing said shutter plates to said axles whereby said shutter plates pivot to close against said rings and said arms from the direction of said outer end of said casing and blank off said openings, said shutter plates being out-of-balance about said axles whereby they tend to close when said casing is in the operative position, such closure of said plates being adapted to be overcome automatically to open said plates when the pressure of an air flow induced by said impeller exceeds the pressure of any air flow through said casing in the opposite direction, the degree of such opening of said plates being dependent upon the amount by which the impeller-induced air flow pressure exceeds that of any air flow through said casing in the opposite direction.

4. A ventilating fan as set forth in claim 3, wherein said members are T-shaped and comprise stems aligned with said radial arms and bars which are substantially parallel to and spaced outwardly from said outer ring, and said bearings are countersunk holes in the ends of said bars.

5. A ventilating fan as set forth in claim 4, including means for locking said shutter plates in the opened and closed positions, said means comprising projections on the sides of said bars remote from said stems, a ring concentric with said common circle and freely mounted about said projections, manually-operable means for turning said ring in either direction about said projections, cam means mounted on said plates, abutment means on said ring and adapted to co-operate with said cam means to lock said plates in the open position on turning of said ring through a predetermined arc in one direction and to lock said plates in the closed position on turning of said ring through a predetermined arc in the other direction.

6. A shutter plate as claimed in claim 5, including means limiting turning movement of said ring to an arc extending between points where said shutter plates are fully open and fully closed.

7. A shutter device as set forth in claim 6, wherein said concentric ring is spaced from the surfaces of said shutter plates opposed to said axles, and said cam means are on the latter surfaces.

References Cited in the file of this patent

UNITED STATES PATENTS

| | | |
|---|---|---|
| 192,181 | Morrison | June 19, 1877 |
| 323,008 | Williams | July 28, 1885 |